(12) United States Patent
Zhang

(10) Patent No.: US 12,537,261 B2
(45) Date of Patent: Jan. 27, 2026

(54) TRACTION BATTERY PACK VENTING ASSEMBLY AND VENTING METHOD

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 721 days.

(21) Appl. No.: 17/887,837

(22) Filed: Aug. 15, 2022

(65) Prior Publication Data

US 2024/0055718 A1 Feb. 15, 2024

(51) Int. Cl.
*H01M 50/249* (2021.01)
*H01M 50/211* (2021.01)
*H01M 50/342* (2021.01)

(52) U.S. Cl.
CPC ..... *H01M 50/3425* (2021.01); *H01M 50/211* (2021.01); *H01M 50/249* (2021.01); *H01M 2220/20* (2013.01)

(58) Field of Classification Search
CPC .......................... H01M 50/358; H01M 50/249
See application file for complete search history.

(56) References Cited

U.S. PATENT DOCUMENTS

| | | | |
|---|---|---|---|
| 6,066,042 A * | 5/2000 | Oravetz | F24F 7/00 429/71 |
| 7,433,794 B1 | 10/2008 | Berdichevsky et al. | |
| 8,557,415 B2 | 10/2013 | Herron et al. | |
| 9,482,112 B2 | 11/2016 | Down | |
| 11,217,857 B2 | 1/2022 | Lindstrom et al. | |
| 2003/0121722 A1* | 7/2003 | Crombeen | F01N 1/089 181/275 |
| 2009/0111063 A1 | 4/2009 | Boardman et al. | |
| 2012/0117886 A1 | 5/2012 | Krishnan et al. | |
| 2020/0328389 A1 | 10/2020 | Lloyd | |
| 2022/0102692 A1* | 3/2022 | Leffert | H01M 10/6556 |
| 2022/0158146 A1* | 5/2022 | Janarthanam | H01M 50/249 |

FOREIGN PATENT DOCUMENTS

EP 3443603 A1 2/2019

* cited by examiner

*Primary Examiner* — Mark Ruthkosky
*Assistant Examiner* — Sarah J Jacobson
(74) *Attorney, Agent, or Firm* — David B. Kelley; Carlson, Gaskey & Olds, P.C.

(57) ABSTRACT

A battery pack venting assembly includes a battery pack vent that communicates a flow of vented gas through a vented gas passage from a vented gas inlet to a vented gas outlet. The battery pack vent has at least one ambient air passage configured to communicate ambient air into the vented gas passage.

12 Claims, 4 Drawing Sheets

TRACTION BATTERY PACK VENTING ASSEMBLY AND VENTING METHOD

TECHNICAL FIELD

This disclosure relates generally to discharging vented gas from a traction battery pack and, more particularly, to cooling the vented gas prior to the discharging.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

SUMMARY

In some aspects, the techniques described herein relate to a battery pack venting assembly, including: a battery pack vent that communicates a flow of vented gas through a vented gas passage from a vented gas inlet to a vented gas outlet, the battery pack vent having at least one ambient air passage configured to communicate ambient air into the vented gas passage.

In some aspects, the techniques described herein relate to a battery pack venting assembly, wherein the battery pack vent includes a radially outer shield assembly and a radially inner shield assembly.

In some aspects, the techniques described herein relate to a battery pack venting assembly, further including a plurality of support legs that support the radially inner shield assembly within the radially outer shield assembly.

In some aspects, the techniques described herein relate to a battery pack venting assembly, wherein the radially outer shield assembly establishes a radially outer boundary of the vented gas passage.

In some aspects, the techniques described herein relate to a battery pack venting assembly, wherein the battery pack has a length from the vented gas inlet to the vented gas outlet, the radially inner shield assembly establishes a radially inner boundary of the vented gas passage over a distance that is less than the length.

In some aspects, the techniques described herein relate to a battery pack venting assembly, wherein the radially inner shield assembly is configured to communicate ambient air into the vented gas passage at a position between the vented gas outlet and the vented gas inlet.

In some aspects, the techniques described herein relate to a battery pack venting assembly, wherein the radially inner shield assembly includes the ambient air passage that extends from an ambient air passage inlet to an ambient air passage outlet, the ambient air passage outlet opening to the vented gas passage and disposed between the vented gas inlet and the vented gas outlet.

In some aspects, the techniques described herein relate to a battery pack venting assembly, wherein the vented gas outlet extends circumferentially about an entirety of the ambient air passage of the radially inner shield assembly.

In some aspects, the techniques described herein relate to a battery pack venting assembly, wherein the radially inner shield assembly is configured to redirect ambient air radially outward through the ambient air passage outlet into the vented gas passage.

In some aspects, the techniques described herein relate to a battery pack venting assembly, wherein the ambient air passage outlet is an annulus.

In some aspects, the techniques described herein relate to a battery pack venting assembly, wherein the battery pack vent includes an ambient air passage within a radially outer shield assembly of the battery pack vent, the ambient air passage configured to communicate ambient air into the flow of vented gas at a position between the vented gas inlet and the vented gas outlet.

In some aspects, the techniques described herein relate to a battery pack venting assembly, wherein the ambient air passage provided by the radially outer shield assembly is an annulus.

In some aspects, the techniques described herein relate to a battery pack venting assembly, wherein the radially outer shield assembly includes an upstream outer shield portion spaced from a downstream outer shield portion to provide the ambient air passage.

In some aspects, the techniques described herein relate to a battery pack venting assembly, wherein the ambient air passage is a first ambient air passage provided in the radially outer shield assembly, and further including a radially inner shield assembly providing a second ambient air passage configured to communicate ambient air into the flow of vented gas at a position between the vented gas inlet and the vented gas outlet.

In some aspects, the techniques described herein relate to a battery pack venting assembly, wherein the first ambient air passage is radially outside the second ambient air passage.

In some aspects, the techniques described herein relate to a method of venting gas, including: discharging a flow of vented gas through a vented gas outlet of a battery pack vent; and prior to the discharging, mixing ambient air with the flow of vented gas.

In some aspects, the techniques described herein relate to a method, further including introducing the ambient air into the flow of vented gas at a position between the vented gas outlet and a vented gas inlet.

In some aspects, the techniques described herein relate to a method, further including introducing ambient air into the flow of vented gas through a radially outer annulus and through a radially inner annulus.

In some aspects, the techniques described herein relate to a method, moving ambient air to the radially inner annulus through an inner shield assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to a traction battery pack of an electrified vehicle, and in particular to a venting assembly of the traction battery pack.

An example traction battery pack includes more than one battery array housed within an enclosure. Each battery array has a plurality of battery cells.

Occasionally, a thermal propagation event could lead to increased pressure and temperature in one of the battery cells. The increasing pressure and temperature can rupture the battery cell, which results in a venting of gas from the interior of the battery cell. The traction battery pack includes one or more venting assemblies used to communicate the gas from an interior of the enclosure to an ambient environment that is outside the traction battery pack and outside the electrified vehicle.

Notably, the one or more venting assemblies are configured to introduce ambient air to the gas that is vented from the battery cells. The ambient air mixes with the gas prior to the gas being discharged from the venting assembly. Mixing the gas with ambient air can reduce a temperature of the gas discharged from the venting assembly.

Figure 1:
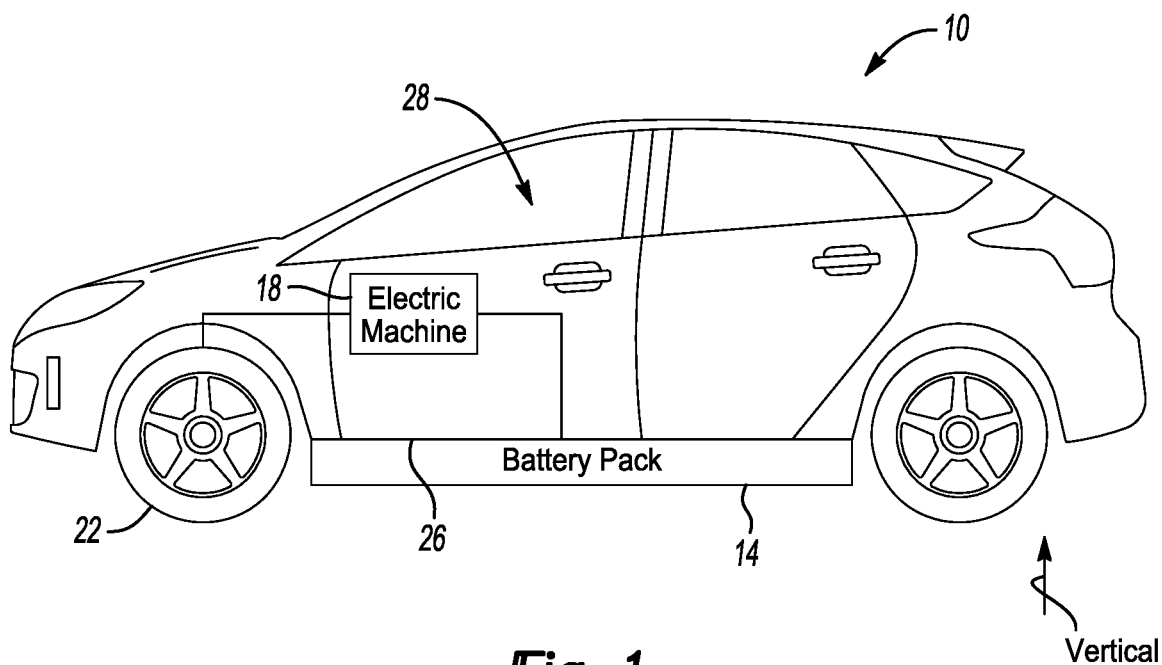
FIG. 1 illustrates a side view of an electric vehicle having a traction battery pack.

With reference to FIG. 1, an electrified vehicle 10 includes a traction battery pack 14, an electric machine 18, and wheels 22. The battery pack 14 powers an electric machine 18, which converts electric power to torque to drive the wheels 22. The battery pack 14 is a traction battery pack as the battery pack 14 is used for electric propulsion.

The battery pack 14 is, in the exemplary embodiment, secured to an underbody 26 of the electrified vehicle 10 beneath and outside a passenger compartment 28 of the electrified vehicle 10. The battery pack 14 could be located elsewhere on the electrified vehicle 10 in other examples.

The example vehicle 10 is a battery electric vehicle (BEV). In another example, the vehicle 10 could be another type of electrified vehicle, such as a hybrid electric vehicle (HEV), plug-in hybrid electric vehicle (PHEV), or a conventional vehicle. A hybrid electric vehicle selectively drives wheels using torque provided by an internal combustion engine instead of, or in addition to, an electric machine. Generally, the electrified vehicle 10 could be any type of vehicle having a traction battery pack.

Figure 3:
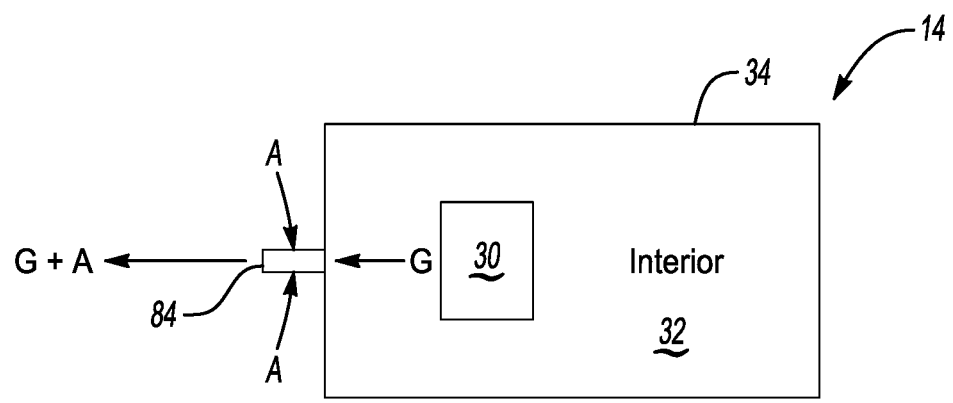
FIG. 3 illustrates a highly schematic view of the traction battery pack of FIG. 1 venting gas.
Figure 2:
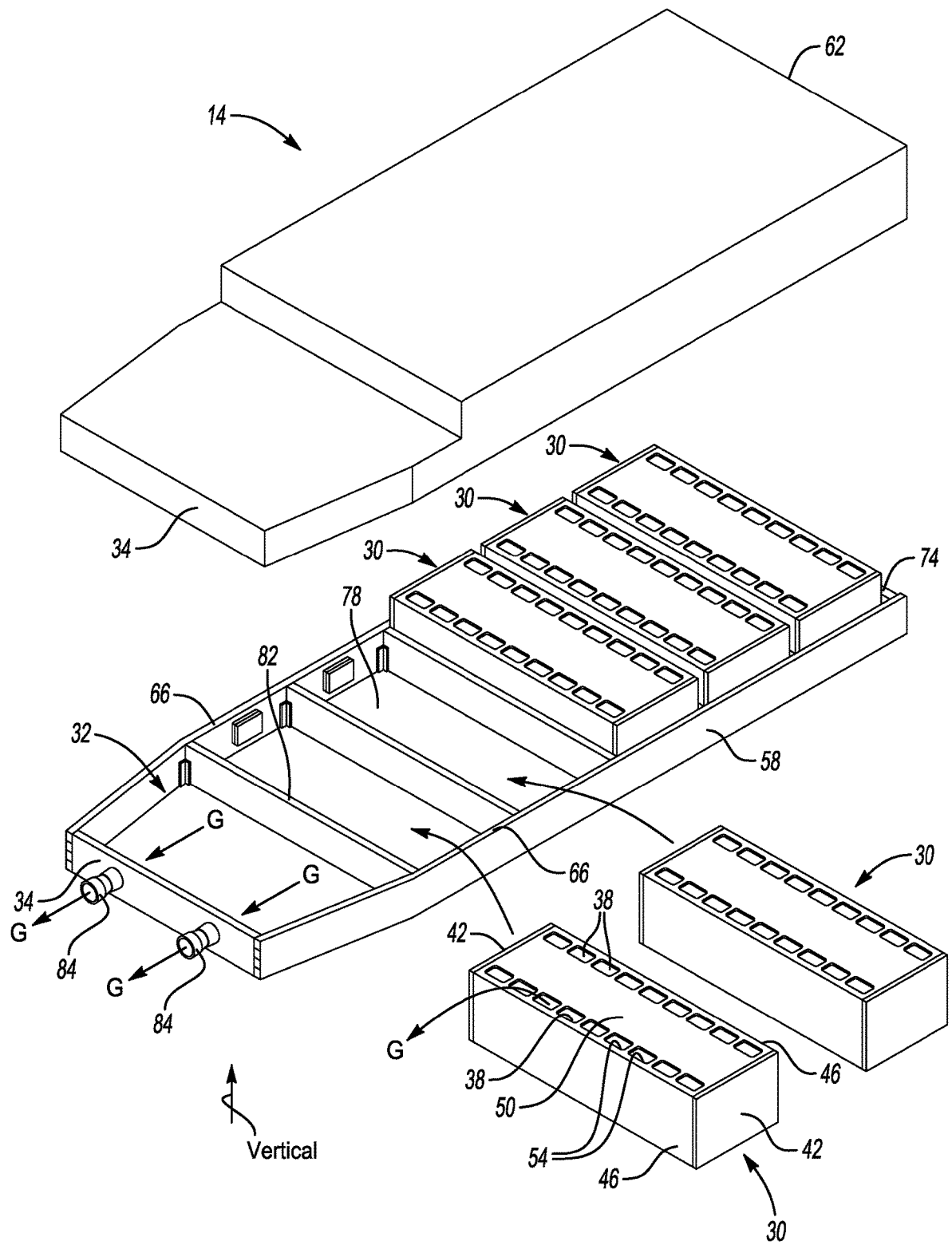
FIG. 2 illustrates a perspective expanded view of the traction battery pack from FIG. 1.

Referring now to FIGS. 2 and 3 with continuing reference to FIG. 1, the battery pack 14 includes a plurality of battery arrays 30 housed within an interior 32 of an enclosure 34. The battery arrays 30 each include groups of individual battery cells 38 arranged in a rows. In an embodiment, the battery cells 38 are lithium-ion pouch cells. However, battery cells having other geometries (cylindrical, prismatic, etc.), other chemistries (nickel-metal hydride, lead-acid, etc.), or both could alternatively be utilized within the scope of this disclosure.

In this example, the battery cells 38 of the arrays 30 are compressed between the endplates 42. The arrays 30 each further include side plates 46 that cover the sides of the battery cells 38, and a top plate 50 that extends over the vertically upper surfaces of the battery cells 38. Vertical, for purposes of this disclosure is with reference to ground and a general orientation of the vehicle 10 during operation.

From time to time, a thermal propagation event due to, for example, an overcharge or discharge, may increase pressure and temperature in one of the battery cells 38. Thermal propagation events could also be due to internal contamination, battery cell deformation, or electrical shorts. The increasing pressure and temperature within one of the battery cells 38 can eventually cause the battery cell 38 to vent such that vented gas G from an interior of the battery cell 38 is discharged into the interior 32 of the enclosure 34 outside the battery arrays 30. The vented gas G that is vented from the battery cells 38 can include effluents. Although described as a single one of the battery cells 38 venting, more than one of the battery cells 38 can vent at the same time.

Some battery cells 38, such as pouch cells, may not include a discrete vent, but could rupture in various areas due to a thermal propagation event. The rupture provides an opening that is considered a vent. Vented gas G discharged through an opening created by a rupture is, for purpose of this disclosure, also vented gas G.

The vented gas G vented from the battery cell 38 can flow from the battery cell 38 through at least one opening 54 in the top plate 50 as shown in FIG. 3. The vented gas G is then outside the battery cells 38 and the array 30, but within the enclosure 34.

In this example, the enclosure 34 includes a tray 58 and a cover 62. The tray 58 includes sidewalls 66, a forward wall 70, an aft wall 74, and a floor 78. The tray 58, in this example, includes cross-members 82 that extend in a cross-vehicle direction between the sidewalls 66. When the cover 62 is secured to the tray 58, the enclosure 34 completely encloses the arrays 30.

In this example embodiment, at least one battery pack vent 84 is coupled to the enclosure 34. The battery pack vent 84 is used to communicate the vented gas G from the interior 32 of the battery pack 14 to an ambient area that is outside the battery pack 14. For purposes of this disclosure, ambient areas are areas that are outside the battery pack 14, outside the passenger compartment 28 of the vehicle 10, and, if so equipped, outside an engine compartment or trunk of the vehicle 10. Ambient air refers to the air within the ambient areas. A temperature of the ambient air is typically much lower than a temperature of the vented gas G within the interior 32.

Figure 4:
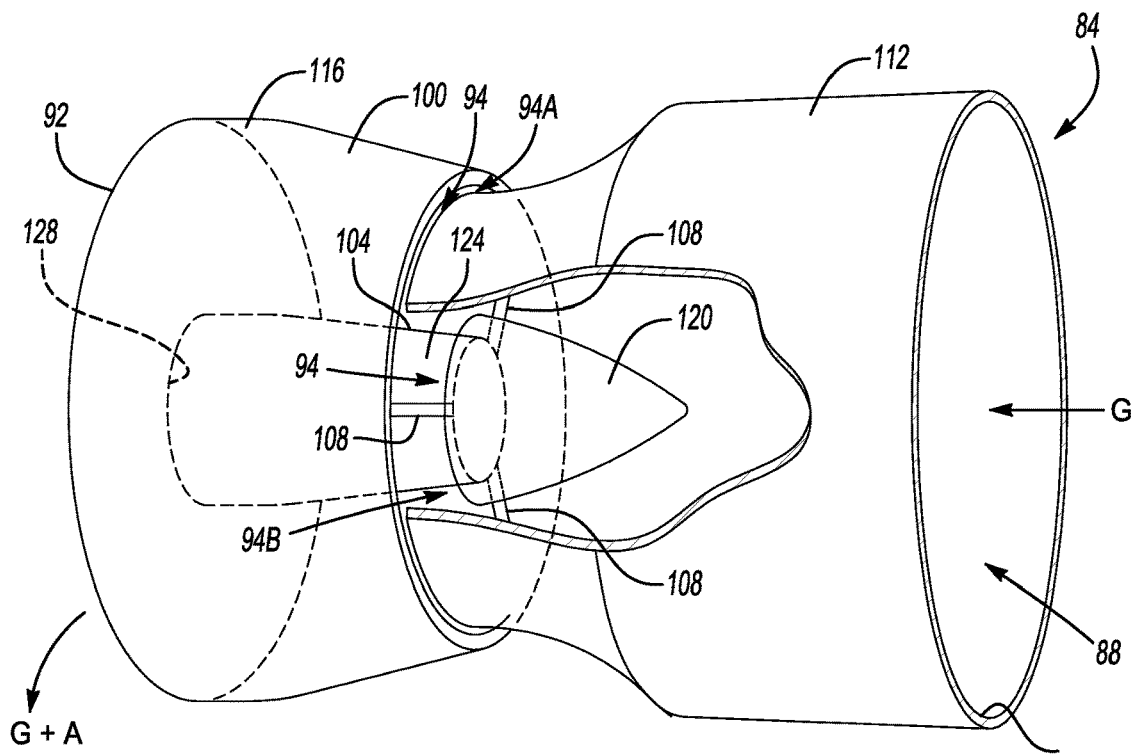
FIG. 4 illustrates a partially sectioned perspective view of a battery pack vent from the traction battery pack of FIG. 3 according to an exemplary embodiment of the present disclosure.
Figure 5:
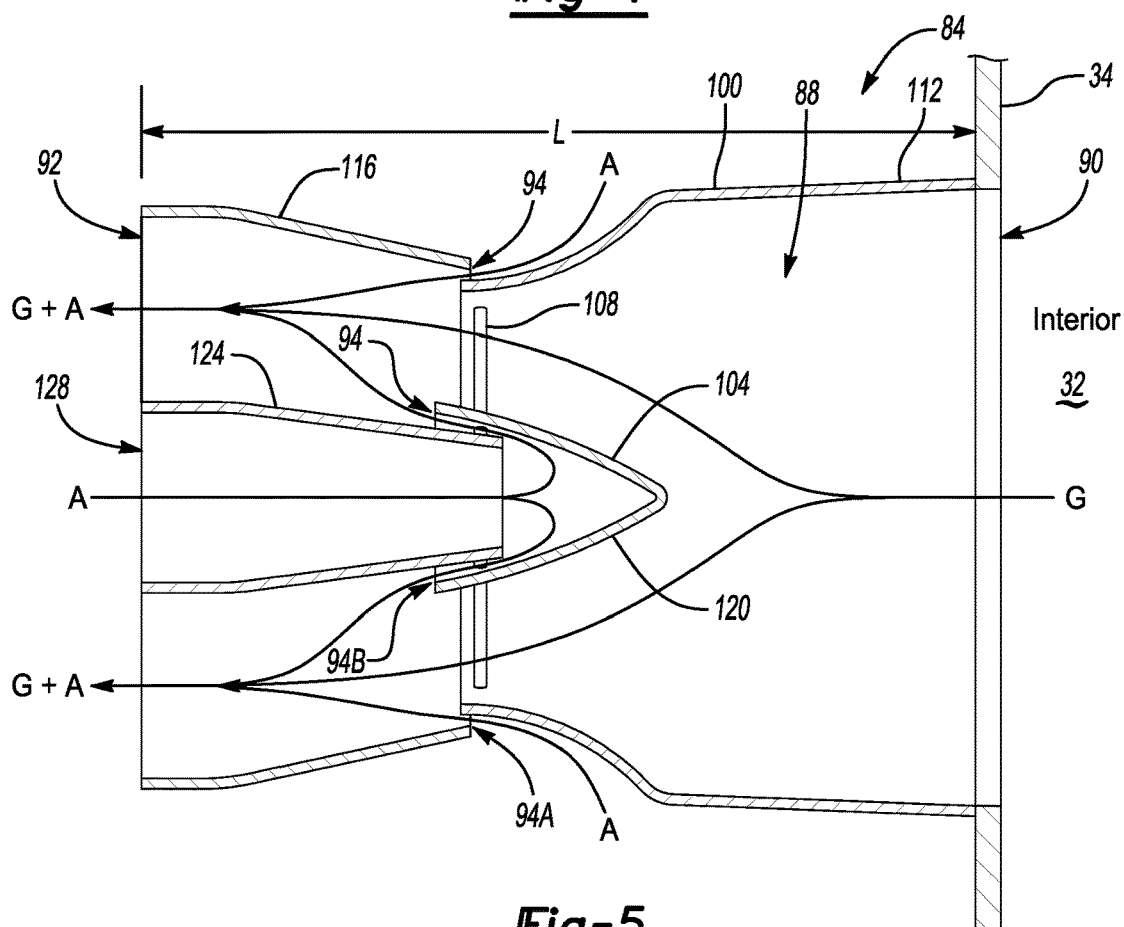
FIG. 5 illustrates a section side view of the battery pack of FIG. 4.

Referring now to FIGS. 4 and 5, the battery pack vent 84 of the battery pack 14 includes a vented gas passage 88 that can communicate a flow of the vented gas G from a vented gas inlet 90 to a vented gas outlet 92. The vented gas inlet 90 is directly coupled to the enclosure 34 and receives the vented gas G from the interior 32. The vented gas outlet 92 communicates the vented gas G to the ambient area. This discharges the vented gas G from the enclosure 34. Reducing a temperature of the expelled products can be desirable to reduce an intensity of thermal energy in the expelled products that is introduced to the ambient area.

The battery pack vent 84, prior to discharging the vented gas G through the vented gas outlet 92, introduces ambient air A to the vented gas G through at least one ambient air passage 94. The ambient air A mixes with the vented gas G within the vented gas passage 88. The ambient air A mixing with the vented gas G to create a mixture of ambient area A and vented gas G. The mixture of ambient area A and vented gas G that is discharged through the vented gas outlet 92 has a lower temperature than the vented gas G that is received through the vented gas inlet 90.

In some examples, the mixture of ambient air A and vented gas G is more than 200 degrees Celsius less than a temperature of the vented gas G received at the vented gas inlet 90.

In this example, the example battery pack vent 84 includes a radially outer shield assembly 100 and a radially inner shield assembly 104. A plurality of support legs 108 support the radially inner shield assembly 104 and the radially outer shield assembly 100 relative to each other. Three support legs 108 are used in this example. The battery pack vent 84 can be a three-dimensional printed structure.

The radially outer shield assembly 100 establishes a radially outer boundary of the vented gas passage 88. the radially inner shield assembly 104 establishes a radially inner boundary of the vented gas passage 88 over some of battery pack vent 84. That is, the battery pack vent 84 has a length L from the vented gas inlet 90 to the vented gas outlet 92, and the radially inner shield assembly 104 extends over a distance that is less than the length L.

The radially outer shield assembly 100 includes an upstream outer shield portion 112 spaced from a downstream outer shield portion 116 to provide a first ambient air passage 94A that opens to the vented gas passage 88. Upstream and downstream are with reference to a flow of the vented gas G through the vented gas passage 88. The first ambient air passage 94A provided by the radially outer shield assembly 100 is an annulus. The first ambient air passage 94A is between the vented gas inlet 90 and the vented gas outlet 92 along the length L of the vent 84.

The upstream outer shield portion 112 tapers downward toward the first ambient air passage 94A. The downstream outer shield portion 116 tapers upward from the first ambient air passage 94A.

An outer boundary of the vented gas inlet 90 is provided by the upstream outer shield portion 112. An outer boundary of the vented gas outlet 92 is provided by the downstream outer shield portion 116.

The radially inner shield assembly 104 includes an upstream inner shield portion 120 spaced from a downstream inner shield portion 124 to provide a second ambient air passage 94B that opens to the vented gas passage 88. The second ambient air passage 94B is configured to communicate ambient air into the flow of vented gas at a position between the vented gas inlet 90 and the vented gas outlet 92.

The downstream inner shield portion 124 includes an ambient air passage 128 that receives ambient air A. The vented gas outlet 92 provided by the downstream outer shield portion 116 extends circumferentially about an entirety of the ambient air passage 128 of the downstream inner shield portion 124.

The downstream inner shield portion 124 tapers downward moving away from the ambient air passage 128 and back toward the upstream inner shield portion 120. The upstream inner shield portion 120 receives the flow of ambient air A from the downstream inner shield portion 124 and redirects the ambient air A at least partially radially outward through the second ambient air passage 94B into the vented gas passage 88. The second ambient air passage 94B, like the first ambient air passage 94A, is an annulus. A diameter of the first ambient air passage 94A is larger than a diameter of the second ambient air passage 94B, and the first ambient air passage 94A is radially outside the second ambient air passage 94B. The first ambient air passage 94A can be considered a radially outer annulus and the second ambient air passage 94B can be considered a radially inner annulus.

Vented gas G discharged into the vented gas inlet 90 flows at a relatively high speed through the vented gas passage 88. As the gas moves through the tapered or neck region of the upstream outer shield portion 112 and over an outer surface of the upstream inner shield portion 120, the velocity increases even more, which generates a vacuum that is lower than ambient pressure. This helps to draw ambient air A through the first ambient air passage 94A and the second ambient air passage 94B as the vented gas G flows adjacent to the first ambient air passage 94A and the second ambient air passage 94B.

Figure 6:
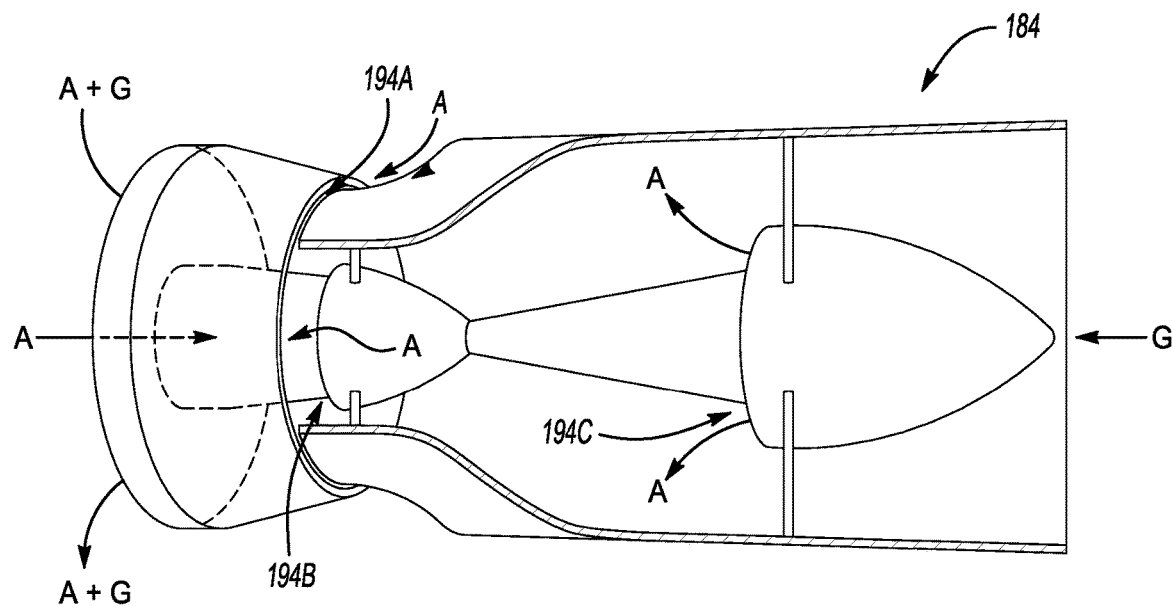
FIG. 6 illustrates a partially sectioned side view of a battery pack vent according to another exemplary embodiment of the present disclosure.

FIG. 6 illustrates a partially section view of a battery pack vent 184 according to another exemplary embodiment where the battery pack vent 184 includes three ambient air passages 194A, 194B, 194C that can deliver ambient air A into a vented gas passage 188 of the battery pack vent 184 The ambient air A mixes with vented gas prior to exiting the battery pack vent 184.

Figure 7:
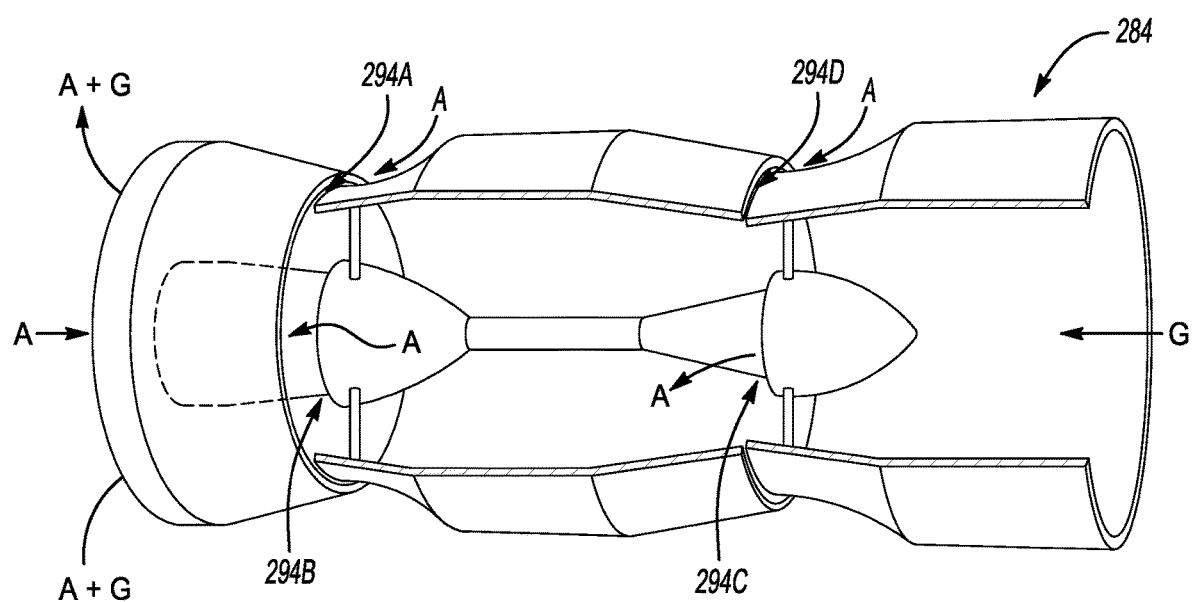
FIG. 7 illustrates a partially sectioned side view of a battery pack vent according to another exemplary embodiment of the present disclosure.

FIG. 7 illustrates a partially section view of a battery pack vent 284 according to yet another example where the battery pack vent 284 includes four ambient air passages 294A, 294B, 294C, 294D that can deliver ambient air to the battery pack vent 284. The ambient air A mixes with vented gas prior to exiting the battery pack vent 284.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A battery pack venting assembly, comprising:
a battery pack vent that communicates a flow of vented gas through a vented gas passage from a vented gas inlet to a vented gas outlet, the battery pack vent having at least one ambient air passage configured to communicate ambient air into the vented gas passage, the battery pack vent coupled to a battery pack enclosure that houses a plurality of individual battery cells, the at least one ambient air passage entirely outside the battery pack enclosure,
wherein the battery pack vent includes a radially outer shield assembly and a radially inner shield assembly,
wherein the radially inner shield assembly includes the ambient air passage that extends from an ambient air passage inlet to an ambient air passage outlet, the ambient air passage outlet opening to the vented gas passage and disposed between the vented gas inlet and the vented gas outlet.

2. The battery pack venting assembly of claim 1, further comprising a plurality of support legs that support the radially inner shield assembly within the radially outer shield assembly.

3. The battery pack venting assembly of claim 1, wherein the radially outer shield assembly establishes a radially outer boundary of the vented gas passage, wherein the battery pack vent has a length from the vented gas inlet to the vented gas outlet, the radially inner shield assembly establishes a radially inner boundary of the vented gas passage over a distance that is less than the length.

4. The battery pack venting assembly of claim 1, wherein the radially inner shield assembly is configured to communicate ambient air into the vented gas passage at a position between the vented gas outlet and the vented gas inlet.

5. The battery pack venting assembly of claim 1, wherein the vented gas outlet extends circumferentially about an entirety of the ambient air passage inlet.

6. The battery pack venting assembly of claim 1, wherein the radially inner shield assembly is configured to redirect ambient air radially outward through the ambient air passage outlet into the vented gas passage.

7. The battery pack venting assembly of claim 1, wherein the ambient air passage outlet is an annulus.

8. A battery pack venting assembly, comprising:
a battery pack vent that communicates a flow of vented gas through a vented gas passage from a vented gas inlet to a vented gas outlet, the battery pack vent having at least one ambient air passage configured to communicate ambient air into the vented gas passage, the battery pack vent coupled to a battery pack enclosure that houses a plurality of individual battery cells, the at least one ambient air passage entirely outside the battery pack enclosure,
wherein the battery pack vent includes an ambient air passage within a radially outer shield assembly of the battery pack vent, the ambient air passage configured to communicate ambient air into the flow of vented gas at a position between the vented gas inlet and the vented gas outlet
wherein the radially outer shield assembly includes an upstream outer shield portion spaced from a downstream outer shield portion to provide the ambient air passage,
wherein the ambient air passage is a first ambient air passage provided in the radially outer shield assembly, and further comprising a radially inner shield assembly providing a second ambient air passage configured to communicate ambient air into the flow of vented gas at a position between the vented gas inlet and the vented gas outlet.

9. The battery pack venting assembly of claim 8, wherein the ambient air passage provided by the radially outer shield assembly is an annulus.

10. The battery pack venting assembly of claim 8, wherein the first ambient air passage is radially outside the second ambient air passage.

11. A method of venting gas, comprising:
discharging a flow of vented gas through a vented gas outlet of a battery pack vent;
prior to the discharging, mixing ambient air with the flow of vented gas;
introducing the ambient air into the flow of vented gas through an radially inner annulus at a position between the vented gas outlet and a vented gas inlet; and
moving ambient air to the radially inner annulus through an ambient air passage provided by an inner shield assembly.

12. The method of claim 11, further comprising introducing ambient air into the flow of vented gas through a radially outer annulus and through the radially inner annulus.

* * * * *